(12) United States Patent
Gao

(10) Patent No.: US 10,423,153 B2
(45) Date of Patent: Sep. 24, 2019

(54) ONLINE MONITORING SYSTEM FOR LAMINATED GLASS VACUUM PRODUCTION LINE

(71) Applicant: Harbin Yihua Power Plant Equipment Co., Ltd., Harbin (Heilongjiang Province) (CN)

(72) Inventor: Jianhua Gao, Harbin (CN)

(73) Assignee: Harbin Yihua Power Plant Equipment Co., Ltd., Harbin (CN)

(*) Notice: Subject to any disclaimer, the term of this patent is extended or adjusted under 35 U.S.C. 154(b) by 18 days.

(21) Appl. No.: 15/947,787

(22) Filed: Apr. 7, 2018

(65) Prior Publication Data

US 2018/0292810 A1 Oct. 11, 2018

(30) Foreign Application Priority Data

Apr. 11, 2017 (CN) .......................... 2017 1 0233278

(51) Int. Cl.
*G05B 19/418* (2006.01)
*B32B 17/10* (2006.01)
*B25J 9/00* (2006.01)
*G05B 19/048* (2006.01)

(52) U.S. Cl.
CPC ........ *G05B 19/4184* (2013.01); *B25J 9/0093* (2013.01); *B32B 17/10036* (2013.01); *B32B 17/10972* (2013.01); *G05B 19/048* (2013.01); *G05B 19/4183* (2013.01)

(58) Field of Classification Search
None
See application file for complete search history.

(56) References Cited

U.S. PATENT DOCUMENTS

| | | | | |
|---|---|---|---|---|
| 3,971,668 A | * | 7/1976 | Pickard | ............ B32B 17/10834 156/104 |
| 6,280,547 B1 | * | 8/2001 | Balduin | ............ B32B 17/10954 156/104 |
| 2009/0139634 A1 | * | 6/2009 | Morgan | ............ B32B 17/10862 156/106 |

* cited by examiner

*Primary Examiner* — Ryan A Jarrett
(74) *Attorney, Agent, or Firm* — Yong Chen

(57) ABSTRACT

A monitoring system for vacuum production line for laminated glass. In some examples, the system includes at least one data acquisition card, a towline, a controller, and a maintenance robot. A pressure detector and a valve are provided for each of the plurality of laminated glass units on the production line. The towline includes a composite rotary joint and an evacuation tube disposed therein. The controller receives data from the pressure detectors and determines if any of the laminated glass units has a leak condition. If a vacuum leak is detected, the controller can alert to the operator, and can also sends the maintenance robot to shut off the valve for the leaking laminated glass unit.

7 Claims, 5 Drawing Sheets

ONLINE MONITORING SYSTEM FOR LAMINATED GLASS VACUUM PRODUCTION LINE

CROSS REFERENCE TO RELATED APPLICATION

This application claims priority to Chinese Patent Application No. 201710233278.7, filed April 11, 2017, the disclosure of which is incorporated herein by reference in its entirety.

TECHNICAL FIELD

The present invention relates to an online monitoring system for a vacuum production line for laminated glass.

BACKGROUND

Laminated glass is widely used in construction, automotive windshield and other fields. It is made of two pieces of glasses (which may be flat or curved) with a layer of special film glue in sandwiched therebetween. VPL (Vacuum Process Line) is an important link in the laminated glass production line. Typically, for the two pieces of glass to bond well together, the vacuum between them must be high, and the glass need to be heated between 120-140° C. at such vacuum condition for a period of time. Thus, the maintenance of high vacuum is crucial for the production of laminated glass.

There is no automatic online detection for the vacuum in the pairs of glass panels in existing production lines of laminated glass. Whether the desired level of vacuum is maintained in the actual operation of the production line is largely left to the experience of the operators (they often make the determination whether there is a vacuum leak by listening to the sound of the production line), or by using a pressure gauge at the main vacuum suction pipe to monitor possible vacuum leak. If only some sections of the glass have vacuum leak while other sections are intact, this detection method would often fail to detect the leak. Furthermore, because the vacuum line for all paired units of glass panels is connected, a vacuum leakage anywhere in the production line would affect many other units in the product line, resulting in batch of products not meeting the production standard. Thus, the yield of finished products meeting the quality standard of the finished products is low.

SUMMARY OF THE INVENTION

The invention provides an online vacuum detection apparatus for a production line for manufacturing laminated glass. The apparatus includes a composite rotary joint, a towline, a controller, a maintenance robot, a plurality of data acquisition cards, a plurality of pressure detectors and a plurality of valves. A plurality of laminated glass units are arranged on the production line conveyor through the glass brackets. Each of adjacent N pressure detectors form a group of pressure detectors, and are connected to data acquisition card. A plurality of data acquisition cards are arranged on the production line conveyor, and each data acquisition card is located in a sealed box. The starting end of the towline is provided on the production line conveyor 8. The end of the towline is provided with a composite rotary joint. Inside the towline a cooling pipe, a vacuum tube, and a signal output line are included. One end of cooling pipe is connected to an air supply pump, and the other end of the cooling pipe is connected to the sealed box through the composite rotary joint. One end of the evacuation tube is connected to the vacuum pump, and the other end of the vacuum tube is connected to a suction end of the laminated glass units through the composite rotary joint. One end of the signal output line is connected with the data acquisition card through the composite rotary joint, the other end of the signal output line is connected with the controller. The air supply pump and the vacuum pump are connected with the controller respectively. The production line heating furnace is provided with a maintenance robot, which can be used to close the valve for a particular laminated glass unit when a vacuum leak is detected. As used herein, the term "pressure detector" encompasses a variety of sensors that detects pressure a fluid, including but not limited to, a pressure sensor and a flow sensor.

The benefits and advantages provided by the invention over currently available technology include:

1. In the present invention, to each evacuation loop is attached a pressure detector, which can detect the vacuum condition of each pairs of laminated glass in real time.

2. The detection result from the pressure detector is continuously fed back to the controller. Upon detection of any abnormal condition, an alarm will sound to prompt immediate inspection and repair.

3. Data obtained from multiple pressure detectors is transferred to the controller through one data acquisition card, reducing the number of power lines and signal lines of the production line.

4. The data acquisition card is placed in an airtight box and cooled with air, ensuring it to work properly at a temperature over 140° C.

5. The vacuum pipe, the cooling pipe for the data collection card, the data bus for the information collection card, and the power line of the pressure detector and the data collection card are all placed within the connecting tow links (or towline) so as to prevent entangling and interfering with the operations of production line.

6. The configuration of the composite rotating joint can efficiently prevent the lines and pipes from intertwining caused the lateral and rotational movement of the production line.

7. The maintenance robotic arm can automatically close the valve for the vacuum loop for the laminated glass unit where a vacuum leak is detected without stopping the production line as a whole, allowing the maintenance of proper vacuum for other laminated glass units being manufactured on the production line. Therefore, the efficiency of the production line is improved.

DETAILED DESCRIPTION

The First Embodiment

Figure 1:
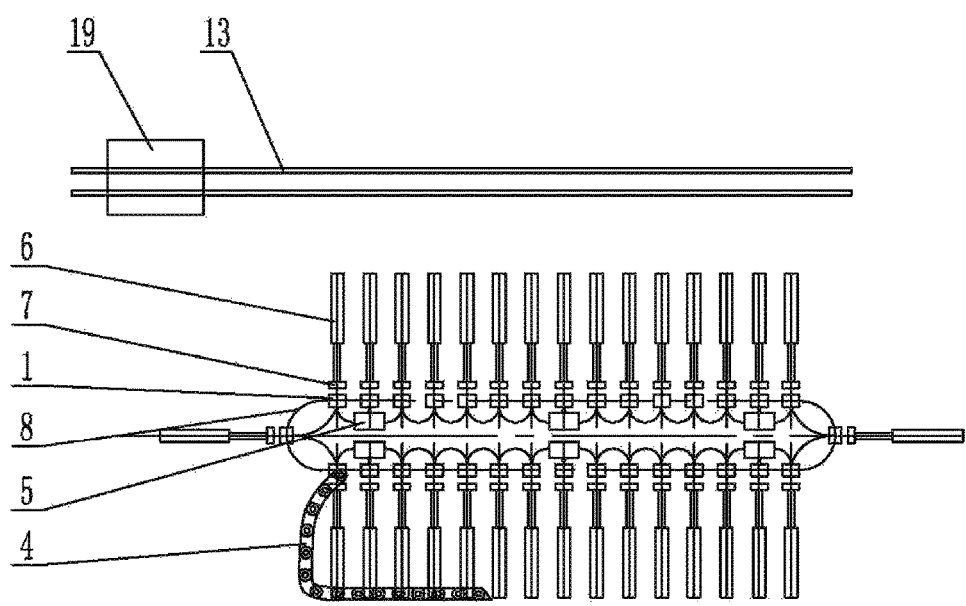
FIG. 1 is a schematic view of an overall system according to certain embodiments of the present invention.

This embodiment is described below with reference to FIGS. 1 to 5. The online detection device for a laminated glass evacuation line includes a composite rotary joint 3, a towline 4, a controller, a maintenance robot (or robotic arm), a plurality of data acquisition cards 5, a plurality of pressure detectors 1, a plurality of valves 2, multiple laminated glass units 6 are uniformly arranged on the production line conveyor 8 through glass brackets 7. Each end of the laminated glass units 6 is provided with a pressure detector 1 and valve 2. N adjacent or neighboring pressure detectors 1 together constitute a group of pressure detectors. Each group of pressure detectors are connected to a data acquisition card 5. A plurality of data acquisition cards 5 are uniformly arranged on the production line conveyor 8. The data acquisition cards 5 are provided within the sealing box 11. The beginning of the towline 4 is disposed on the production line conveyor 8, and includes a rotary joint 3. Within the towline 4 there is provided a cooling pipe 9, and a vacuum tube 10. One end of the cooling pipe 9 is connected to an air supply pump, and the other end of the cooling pipe 9 is connected to the sealing box 11 through the rotary joint 3. One end of the evacuation tube 10 is connected to a vacuum pump, and the other end of the evacuation tube 10 is connected to the suction end of the laminated glass 6 by the rotary joint 3. The data acquisition card 5 outputs the gathered signals to the controller, and is connected with the controller via a signal output line which runs through the rotary joint 3. The air supply pump and the vacuum pump are each respectively connected with the controller. The production line has a heating furnace which is provided with the maintenance robotic arm, which can be used to effectuate the closing of the valve 2 if needed, e.g., during an emergency, as controlled by the controller.

This embodiment can simultaneously detect the vacuum status of all laminated glass units 6 that are installed in the glass brackets 7. To reduce wiring, each group of pressure detectors 1 are connected to a data acquisition card 5, which can be a multi-channel data acquisition card. Each channel of the multi-channel data acquisition card is connected to an individual pressure detector 1. Data acquisition cards 5 are installed on production line conveyor 8 and rotate with the conveyor 8. A fixed relative configuration is maintained between the pressure detectors 1 and data acquisition card 5. With signal output connection between multiple data acquisition cards 5 and the controller, the controller can monitor in real-time the data collected from each pressure detector 1, and determine the degree of vacuum of each laminated glass unit 6. If a vacuum leak occurs in any of the laminated glass units, a display of the controller can show an alert message. Other alerts, such as sound and light, can also be produced by the controller to catch the attention of the operator to promptly deal with the situation. The controller can also send instructions to the maintenance robotic arm, which upon receiving such instructions, can move to the laminated glass unit where the vacuum leak occurs, close the valve 2 associate with the laminated glass unit, and return to its original ready position for next dispatch.

As the vacuum line of each of the laminated glass unit 6 is equipped with pressure detector 1, vacuum measurement can be done continuously. The pressure detector 1 can include a high-precision sapphire vacuum sensor, which coupled with high temperature processing circuit that works at a temperature as high as 140° C. so as to provide satisfactory reliability.

This embodiment employs a high-speed data collection system, and therefore it is possible to quickly measure the vacuum of all the measurement points, and quickly identify the presence or absence of a vacuum leak in any of the laminated glass units.

A vacuum or pressure threshold at which an alert message is produced for the pressure detector 1 can be set within a certain range. Pressure detector 1 is positioned close to the measured working position. For example, if the measured pressure is the atmospheric pressure, it can be determined at that working position no workpiece (laminated glass unit being processed) is loaded with any laminated glass unit, therefore no alert is produced. If the measured pressure is lower than a pressure threshold, e.g., −90 KPa, it can be determined at that measurement point a workpiece (laminated glass) is loaded and being processed properly. If the measured pressure is above such a threshold but below atmospheric pressure, it can be determined that the working station is loaded with a workpiece, but there may be a vacuum leak. If after repeated measurement, similar pressure measurements are obtained, the vacuum leak can be confirmed. An alert message or an alarm (e.g., visual or audible) can be produced by the controller, calling for the operator's attention to properly handle the situation, including for example, stopping the production line.

The temperature of the heating furnace in the production line can reach 140° C., To ensure that the data acquisition card 5 to operate properly at such high temperature, an insulated sealing box 11 is provided to enclose the data acquisition card. The sealing box is ventilated to cool the data acquisition card 1 to ensure that the data acquired by the data acquisition card 1 are trustworthy. The analog signal transmitted from each pressure detector 1 is digitally converted in the data acquisition card 5, and is outputted through a high temperature cable to the display screen of the controller, showing the measurement results for each measurement point.

High temperature wires are used for pressure detector 1 power line and signal transmission lines. All measured pressure signals are converted to digital signals in the data acquisition card 5, which outputs the converted digital signals through signal transmission lines through the composite rotary joint 3 and then the towline 4, then to the controller positioned outside the heating furnace.

In one example, every adjacent 48 pressure detectors 1 can constitute a group of the pressure detectors 1. Each data acquisition card 5 has a total of 48 channels for processing the data collected by the 48 pressure detectors, The entire VPL line is installed with 6 data acquisition card 5 to process the data from 288 pressure detectors.

The controller in this embodiment can collect data in real time received from the pressure detector 1 located at different positions. The controller can efficiently compress and analyze the collected data, and can automatically filter the data, e.g. by retaining data relating to alarm conditions, and deleting other data. When the pressure changes abnormally, the controller can produce alerts as described herein and automatically record the associated data. The alerts are turned off after the data returns to normal.

Pressure detector 1 can be HPT-1-0-4-M20 sapphire vacuum pressure detector, having a range −0.1 to 0 MPa, temperature range 0 to 150 ° C., and output 4 to 20 mA.

Data acquisition card 5 can have a USB, RS232, RS485 bus interface, with an analog output, digital input, digital output, counting, frequency measurement and other functions. Alternatively, data acquisition card 5 can be dispensed with and the pressure detectors are coupled directly to the signal output line which is connected to the controller. In such a case, each pressure detector can include an electronic component to convert the sensed analog signals to digital signals, which are then sent through the signal output line to the controller.

The controller processes the pressure data collected by the pressure detector 1, monitors the state of each pressure detector 1, and produces alarms when any abnormal condition occurs.

In this embodiment, the valve 2 can be a ball valve, and the towline 4 can be a steel-aluminum towline.

The Second Embodiment

Figure 2:
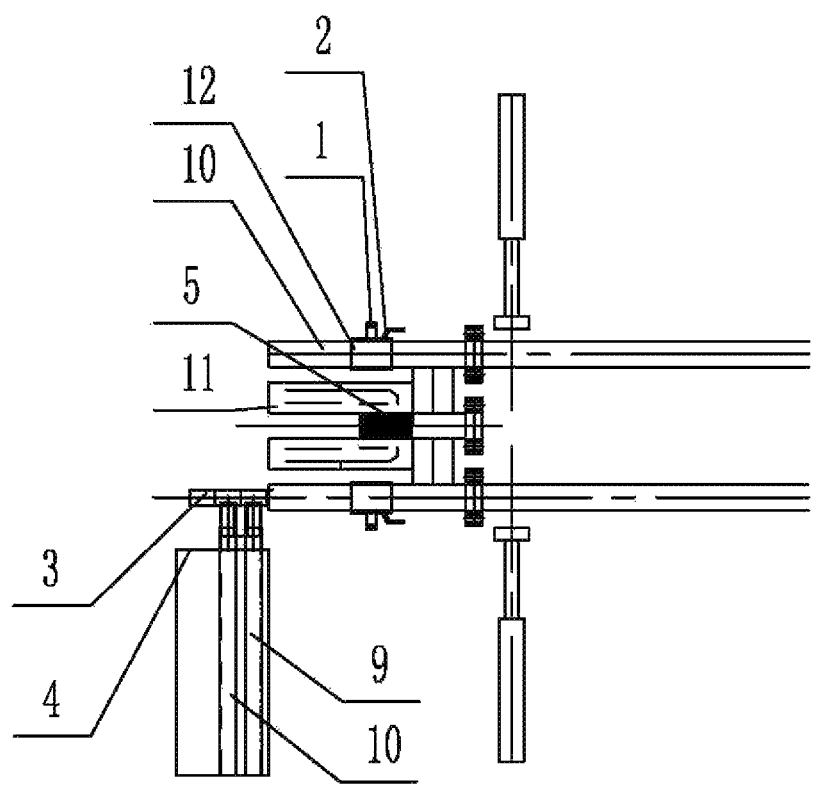
FIG. 2 is a schematic view of showing components of the system including pressure detector 1, valve 2, data acquisition card 5, the composite rotary joint 3 and the towline 4 of certain embodiments of the present invention.

This embodiment is described with reference to FIGS. 1 to 2. The valve 2 in this embodiment is provided between the laminated glass unit 6 and the pressure detector 1, and the outside of the valve 2 is provided with a three-way connector 12, wherein one horizontal end of the connector 12 is connected to the valve 2, the other horizontal end of the connector 12 is connected to the evacuation tube 10, and the vertical end of the three-way connector 12 is connected to the pressure detector 1. The other components and connections are the same as those of the embodiment 1.

The Third Embodiment

This embodiment is described with reference to FIGS. 1 to 4. This composite rotary joint 3 in this embodiment includes a connecting plate 3-1, a cooling air swivel joint 3-2, a vacuum rotary joint 3-3, a cooling air inlet connecting tube 3-4, cooling air outlet connecting tube 3-5, cooling air casing 3-6, wire rotating connector 3-7, wire entry connector 3-8, wire casing tube 3-9, evacuation inlet connecting tube 3-10, evacuation outlet connecting tube 3-11, evacuation tube casing 3-12. The wire rotating joint 3-7, cooling air rotary joint 3-2 and vacuum rotary joint 3-3 are respectively fixed to the connecting plate 3-1 from front to rear.

One end of the evacuation tube casing 3-12 is connected with an evacuation inlet connecting tube 3-10, and the evacuation inlet connecting tube 3-10 is in fluid communication with the evacuation tube casing 3-12. The other end of the evacuation tube casing 3-12 is inserted inside of the vacuum rotary joint 3-3. The vacuum rotary joint 3-3 is connected with the evacuation outlet connecting tube 3-11, and the evacuation outlet connecting tube 3-11 is in fluid communication with the evacuation tube casing 3-12.

One end of the cooling air casing 3-6 is inserted inside the evacuation tube casing 3-12. There is a gap between the cooling air casing 3-6 and the evacuation tube casing 3-12. The other end of the evacuation tube casing 3-12 is fixedly connected to the outside of the cooling air casing 3-6. The other end of the cooling air casing 3-6 is inserted and fixed to the inside of the cooling air casing 3-2, which is connected to the cooling air inlet connecting tube 3-4. The cooling air inlet connecting tube 3-4 is in fluid communication with cooling air casing 3-6. On one side of the evacuation tube casing 3-12 is inserted and installed with a cooling air outlet connecting tube 3-5. The cooling air outlet connecting tube 3-5 is in fluid communication with one end of the cooling air casing 3-6.

The wire casing 3-9 is inserted and enclosed in the inside of the cooling air casing 3-6, and there is a gap between the wire casing 3-9 and the cooling air casing 3-6. An end of the cooling air casing 3-6 is fixedly connected with an outer side wall of the wire casing 3-9, and the wire entry connector 3-8 is inserted on a side wall of one end of the evacuation tube casing 3-12. The wire entry connector 3-8 is in communication with the wire casing 3-9. The wire rotating joint 3-7 is disposed at the other end of the wire casing 3-9 and in communication with the wire casing 3-9. The other components and connections are the same as those of the embodiment 1 or embodiment 2.

The engagement between the evacuation tube casing 3-12, rotary joint 3-3, the cooling casing 3-6, cooling air swivel joint 3-2, and wire casing 3-9, and wire rotating joints 3-7 is all rotatory engagement.

In this embodiment, when evacuation is being performed, the air in the laminated glass unit 6 flows out in the following order: the valve 2, the three-way connector 12, the evacuation tube 10 outside the towline 4, the evacuation inlet connecting tube 3-10, the evacuation tube casing 3-12, the vacuum outlet connecting tube 3-11 and the evacuation tube 10 inside the towline 4.

The cooling air is passed, in sequence, through the cooling pipe 9 inside the towline 4, the cooling air inlet connecting tube 3-4, cooling air casing 3-6, cooling air outlet connecting tube 3-5, cooling pipe 9 outside of the towline 4, and the sealed box 11.

The signal output line of the data acquisition card 5 passes, in sequence, through the wire entry connector terminal 3-8, the wire casing 3-9 and the wire rotating joint 3-7, and enters the towline 4.

In this embodiment, the cooling air inlet connecting tube 3-4 and the outside of the cooling air outlet connecting tube 3-5 are provided with sealing ring 3-14.

The wire entry connector 3-8 in this embodiment can be an aviation plug.

The Fourth Embodiment

This embodiment is described with reference to FIGS. 1 to 4. The evacuation port connecting tube 3-11, the cooling air inlet connecting tube 3-4, and the wire rotating joint 3-7 described in this embodiment are provided at the starting end of the tow chain 4. The other components and connections among components are the same as those of the third embodiment.

The Fifth Embodiment

Figure 3:
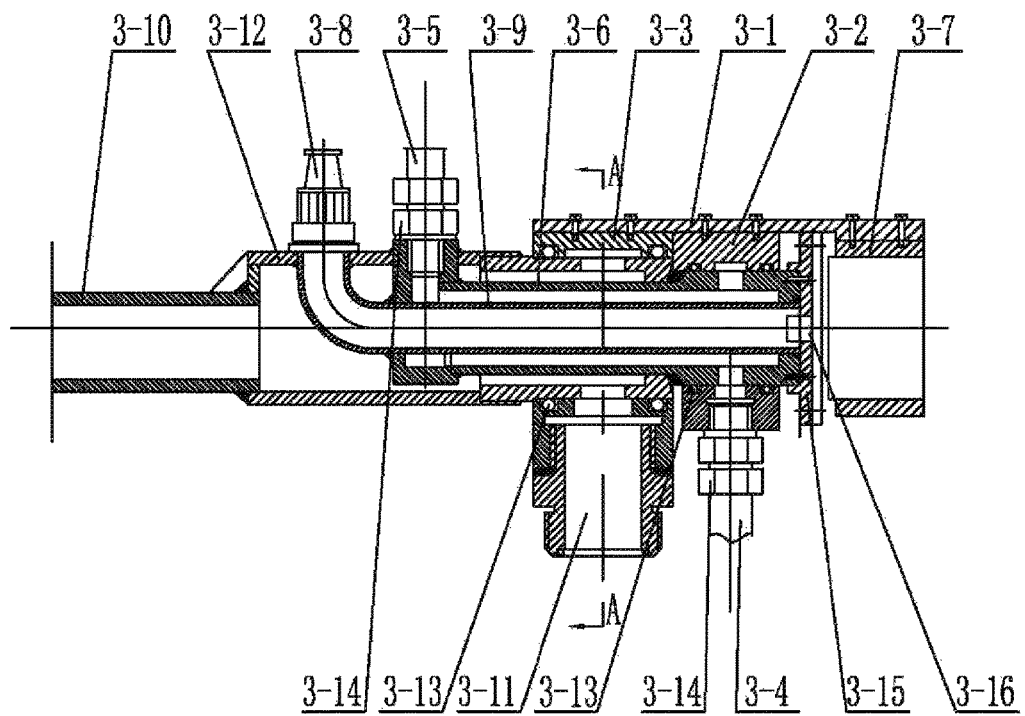
FIG. 3 is a schematic structural view of the composite rotary joint 3 of certain embodiments of the present invention.
Figure 4:
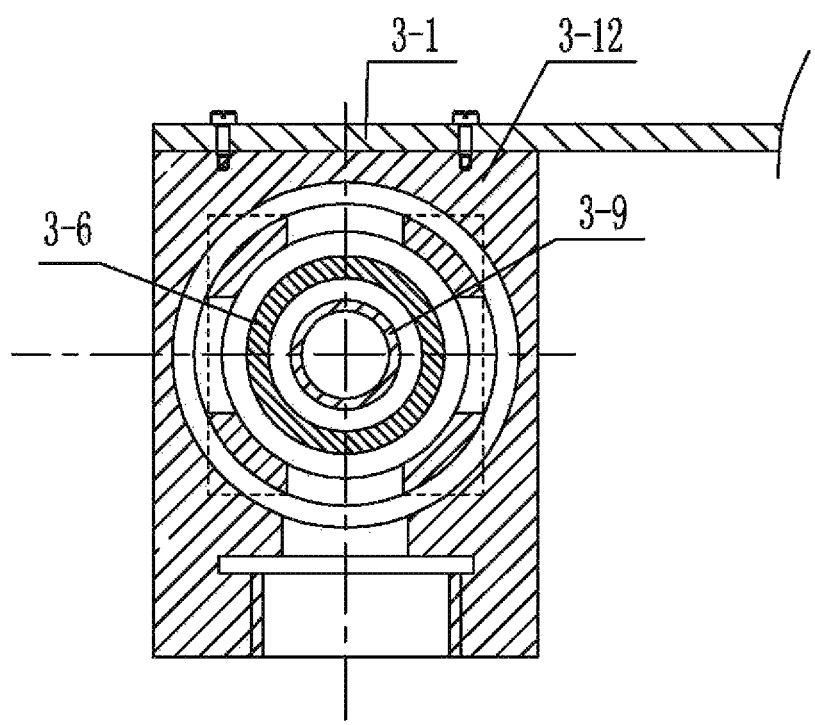
FIG. 4 is A-A sectional view of the composite rotary joint shown in FIG. 3.

This embodiment is described with reference to FIGS. 3 to 4. In this embodiment, an O-ring 3-13 is provided for the connection between the evacuation tube casing 3-12 the evacuation rotary joint 3-3, and for the connection between the cooling air casing 3-6 and the cooling air rotary joint 3-2. This is to ensure the airtightness of the rotary joint 3. The other components and connections are the same as those of the fourth embodiment.

The Sixth Embodiment

This embodiment is described below with reference to FIGS. 3 to 4. A mounting plate 3-15 is provided between the wire casing 3-9 and the wire rotating joint 3-7, and the mounting plate 3-15 is fixed to the wire casing 3-9 and one end of the cooling air casing 3-6. The mounting plate 3-15 is provided with holes 3-16, and is rotatably connected with the wire rotating joint 3-7. In this manner, the signal output line is passed through the holes 3-16 into the wire rotating joint 3-7 and then into the towline 4. The other components and connections are the same as those of the embodiment 4 or 5.

The Seventh Embodiment

This embodiment is described below with reference to FIG. 5. The maintenance robot in this embodiment includes a servo motor 14, a vertically-moving lifting cylinder 15, a horizontally-moving cylinder 16, a closing block 17, a code reader 18, a fixing frame 19, a connecting frame 20, transmission mechanism, two moving rails 13, and a plurality passive electronic tags 23. The two movable rails 13 are arranged in parallel on the inner side wall of the heating furnace in production line, and along the longitudinal direction of the heating furnace in the production line. The rear end of the fixing frame 19 are provided with two chutes 19-1 installed on the outer side of the guide rails 13.

Servo motor 14 is provided on the front end of the fixing frame 19. The fixing frame 19 can slide in the longitudinal direction of the guide rails 13 through the servo motor 14 and the transmission mechanism. The lift cylinder 15 is provided on the top of the fixing frame 19 and moves vertically. The horizontally-moving cylinder 16 is provided on the connecting frame 20 and moves horizontally. The horizontally-moving cylinder 16 is connected with the closing block 17, the top of which is connected with a code reader 18. Each of glass bracket 7 is provided with a passive electronic tag 23. The code reader 18 can read and recognize the passive electronic tag 23. The passive electronic tag 23, the servo motor 14, and the and code reader 18 are each connected to the controller, respectively. Other components and connections are the same as those of embodiments 1, 2, 4 or 5.

When a leak and alarm condition on the production line with regard to any pressure detector 1 is detected, the controller recognizes the glass bracket 7 that is associated with the pressure detector via reading the passive electronic tag 23 on the glass bracket 7, and sends a signal to the maintenance robot to move to a position to locate the corresponding valve 2 for the pressure detector 1, close the valve, and move to its original position. The overall production line can be kept running without interruption when such trouble-shooting procedure is performed.

In this embodiment, the starting position of the maintenance robot is located outside the heating furnace. When the pressure detector 1 detects an abnormal pressure and the controller receives an alarm signal, the controller issues a command to close the valve 2, and the servo motor 14 receives the command from the controller. The servo motor 14 quickly moves the fixing frame 19 along the guide rail 13 to the heating furnace through the transmission mechanism, and the code reader 18 sequentially reads the information on the passive electronic tags 23. When the robot is moved to a position above the passive electronic tag 23 associated with the pressure detector that senses the abnormal pressure, the rotation speed of servo motor 14 is reduced such that the fixing frame 19 and the production line conveyor belt 8 move forward at the same speed. The air rod of lift cylinder 15 extends downward, driving the connecting frame 20 and the horizontally-moving cylinder 16 to descend at the same time. The air rod of the horizontally-moving cylinder 16 extends forward to drive the closing block 17 to move forward. At this time, the closing block 17 is located in front of the rotating handle of the valve 2. Then the servo motor 14 rotate in a reverse direction, slowly drive the closing block 17 to move backward, thereby pushing the handle of the valve 2 to turn 90 degrees, closing valve 2. Then the lifting cylinder 15 is raised, the horizontally-moving cylinder 16 is retracted, and the maintenance robot quickly moved back to its original position.

In the present embodiment, a mounting bracket 24 is fixedly connected to the air rod of the horizontally-moving cylinder 16. The closing block 17 is fixedly connected to the lower end of the mounting bracket 24. The code reader 18 is disposed on the outer end of the mounting bracket 24. The shape of the closing block 17 is cylindrical. The outer side of the closing block 17 is provided with a rolling sleeve which is vertically installed on the outer side of the closing block 17. A bearing is disposed between the rolling sleeve and the closing block 17 to facilitate the closing of the valve 2.

In the present embodiment, the air rod of the lifting cylinder 15 is hingedly connected with the connecting frame 20. The horizontally-moving cylinder 16 and the connecting frame 20 are also hingedly connected.

Figure 5:
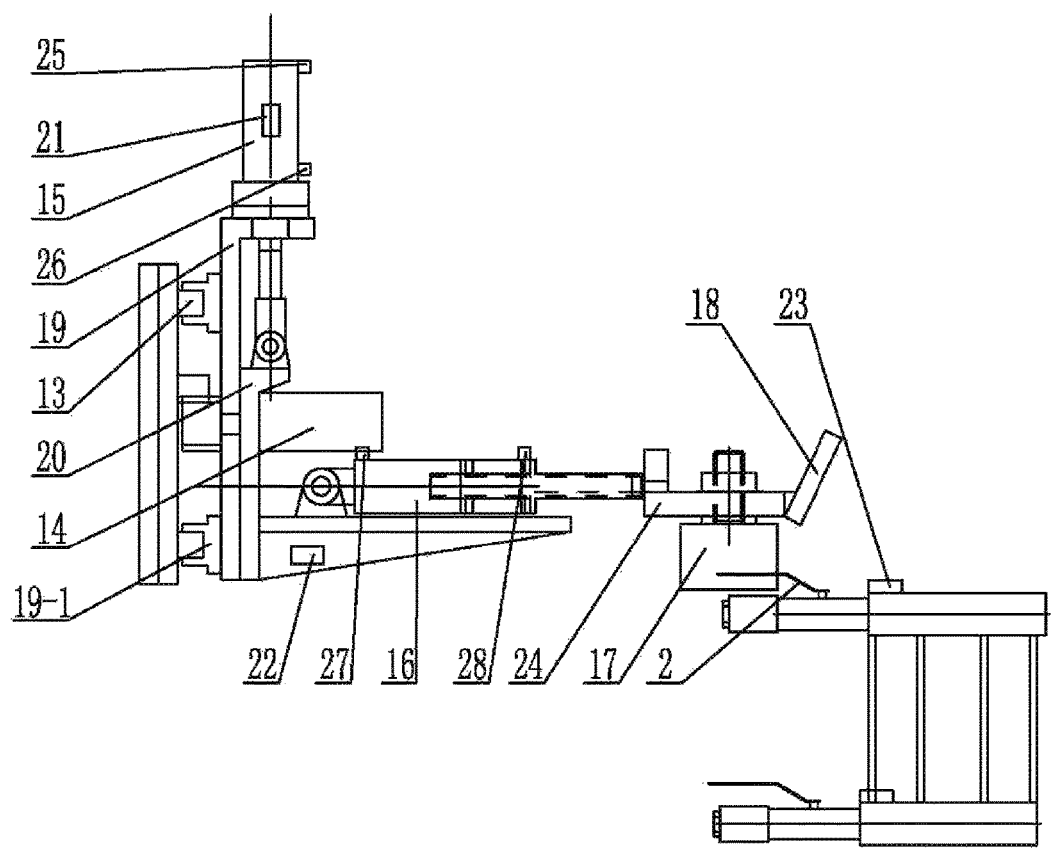
FIG. 5 is a schematic structural view of a maintenance robotic arm of certain embodiments of the present invention.

In some embodiments, and with reference to FIG. 5, the lifting cylinder 15 is provided with a lifting solenoid valve 21, the horizontally-moving cylinder 16 is provided with a horizontally-moving solenoid valve 22. Each of the lifting solenoid valve 21 and horizontally-moving solenoid valve 22 is respectively connected to the controller. The controller issues commands to the lifting solenoid valve 21, which controls the ascent and descent of the lifting cylinder 15. The controller also issues commands to the horizontally-moving solenoid valve 22, which controls the extension and retraction of the horizontally-moving cylinder 16.

In some embodiments, and with reference to FIG. 5, the lifting cylinder 15 is provided with a first up-down movement sensing switch 25 and a second up-down movement sensing switch 26, and the horizontally-moving cylinder 16 is provided with a first transverse movement sensing switch 27 and a second transverse movement sensing switch 28.

This invention can simultaneously detect the degree of vacuum of all the laminated glass units 6 installed on the glass brackets 7, and the pressure detector 1 and the valve 2 are provided on the suction end of each of the laminated glass 6. In order to reduce wiring, each group of pressure detectors 1 is connected to a multi-channel data acquisition card 5, where each channel is connected to an individual pressure detector. The data acquisition cards 5 are installed on the production line conveyor 8 and can rotate with the device. A relative fixed spaced relationship is maintained between the pressure detector 1 and the data acquisition card 5, and the plurality of data acquisition cards 5 are connected to the controller through the signal output line. The controller monitors the data collected by each pressure detector in real time and can include a display to show the degree of vacuum of each vacuumed laminated glass unit. If a vacuum leak is detected at any laminated glass unit, the controller can immediately issue a warning on the display screen, and at the same time issue a sound/light alarm to remind the operator in a timely manner. Also, the controller can provide instructions to the maintenance robot to move to the leaked laminated glass 6 and close its valve 2, and then return to its original standby position.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

The invention claimed is:

1. A monitoring system for a vacuum production line for laminated glass which comprises a plurality of laminated glass units arranged along a production line conveyer, the monitoring system comprising:
    at least one data acquisition card, a towline, a controller, a maintenance robot;
    a pressure detector and a valve provided for each of the plurality of laminated glass units;
    wherein a group of neighboring pressure detectors are each connected with the at least one data acquisition card and each provide sensed pressure data to the at least one data acquisition card;
    wherein a front end of the towline is disposed on the production line conveyor, and includes a composite rotary joint;
    wherein the towline includes an evacuation tube, one end of the evacuation tube passing through the composite rotary joint and being connected with a suction end of each of the plurality of laminated glass units, and the other end of the evacuation tube being connected to a vacuum pump;
    wherein the towline further includes a signal output line, one end of the signal output line passing through the composite rotary joint and being connected to the at least one data acquisition card, and the other end of the signal output line is connected to the controller;
    wherein the controller is configured to:
        responsive to pressure data received from the at least one data acquisition card, determine which, if any, of the laminated glass units has a vacuum leak condition; and
        if a leak condition is determined to be present for a laminated glass unit, direct the maintenance robot to move to the laminated glass unit having the vacuum leak condition and shut off the valve provided for the laminated glass unit.

2. The monitoring system of claim 1, further comprising a three-way connector that includes two horizontal ends and a vertical end, wherein one horizontal end of the three-way connector is connected to the valve, the other horizontal end of the three-way connector is connected to the evacuation tube, and the vertical end of the three-way connector is connected to the pressure detector.

3. The monitoring system of claim 1, wherein:
    the composite rotary joint includes a connecting plate, a cooling air swivel joint, a vacuum rotary joint, a cooling air inlet connecting tube, a cooling air outlet connecting tube, a cooling air casing, a wire rotating connector, a wire entry connector, a wire casing tube, an evacuation inlet connecting tube, an evacuation outlet connecting tube, an evacuation tube casing,
    wherein the wire rotating joint, the cooling air rotary joint and the vacuum rotary joint are respectively fixed to the connecting plate from front to rear;
    wherein one end of the evacuation tube casing connected with an evacuation inlet connecting tube, and the evacuation inlet connecting tube is in fluid communication with the evacuation tube casing; wherein the other end of the evacuation tube casing is inserted inside of the vacuum rotary joint; wherein the vacuum rotary joint is connected with the evacuation outlet connecting tube, and the evacuation outlet connecting tube is in fluid communication with the evacuation tube casing;
    wherein one end of the cooling air casing is inserted inside the evacuation tube casing, and there is a gap between the cooling air casing and the evacuation tube casing; wherein the other end of the evacuation tube casing is fixedly connected to the outside of the cooling air casing; wherein the other end of the cooling air casing is inserted and fixed to the inside of the cooling air casing, which is connected to the cooling air inlet connecting tube; wherein the cooling air inlet connecting tube is in fluid communication with cooling air casing; wherein on one side of the evacuation tube casing is inserted and installed with a cooling air outlet connecting tube; wherein the cooling air outlet connecting tube is in fluid communication with one end of the cooling air casing;
    wherein the wire casing is inserted and enclosed in the inside of the cooling air casing, and there is a gap between the wire casing and the cooling air casing; wherein an end of the cooling air casing is fixedly connected with an outer side wall of the wire casing; where the wire entry connector is inserted on a side wall of one end of the evacuation tube casing; wherein the wire entry connector is in communication with the wire casing; wherein the wire rotating joint is disposed at the other end of the wire casing and in communication with the wire casing.

4. The monitoring system of claim 3, wherein the evacuation tube casing, cooling air inlet connecting tube, and wire rotating joint are all disposed at a starting end of the towline.

5. The monitoring system of claims 4, further comprising a mounting plate provided between the wire casing and the wire rotating joint; wherein the mounting plate is fixed to the wire casing and one end of the cooling air casing; wherein the mounting plate comprises holes and is rotatably connected with the wire rotating joint.

6. The monitoring system of claim 3, further comprising a first O-ring provided for the connection between the evacuation tube casing the evacuation rotary joint, and a second O-ring for the connection between the cooling fan casing and the cooling air rotary joint.

7. A monitoring system for a vacuum production line for laminated glass which comprises a plurality of laminated glass units arranged along a production line conveyer, the monitoring system comprising:
    a towline, a controller, a maintenance robot;
    a pressure detector and a valve provided for each of the plurality of laminated glass units;
    wherein the pressure detectors are each connected with the controller and provide sensed pressure data to the controller;
    wherein a front end of the towline is disposed on the production line conveyor, and includes a composite rotary joint;

wherein the towline includes an evacuation tube, one end of the evacuation tube passing through the composite rotary joint and being connected with a suction end of each of the plurality of laminated glass units, and the other end of the evacuation tube being connected to a vacuum pump;

wherein the controller is configured to:
responsive to pressure data received from the pressure detectors, determine which, if any, of the laminated glass units has a vacuum leak condition; and if a leak condition is determined to be present for a laminated glass unit, direct the maintenance robot to move to the laminated glass unit having the vacuum leak condition and shut off the valve provided for the laminated glass unit.

* * * * *